Jan. 22, 1963 F. W. THIELE 3,074,534
LOOSE MATERIAL DISTRIBUTING APPARATUS
Filed Feb. 20, 1959 2 Sheets-Sheet 1
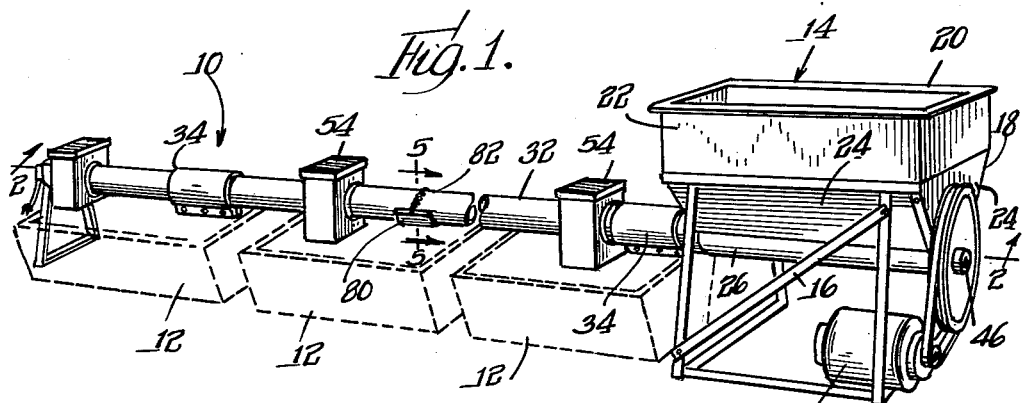
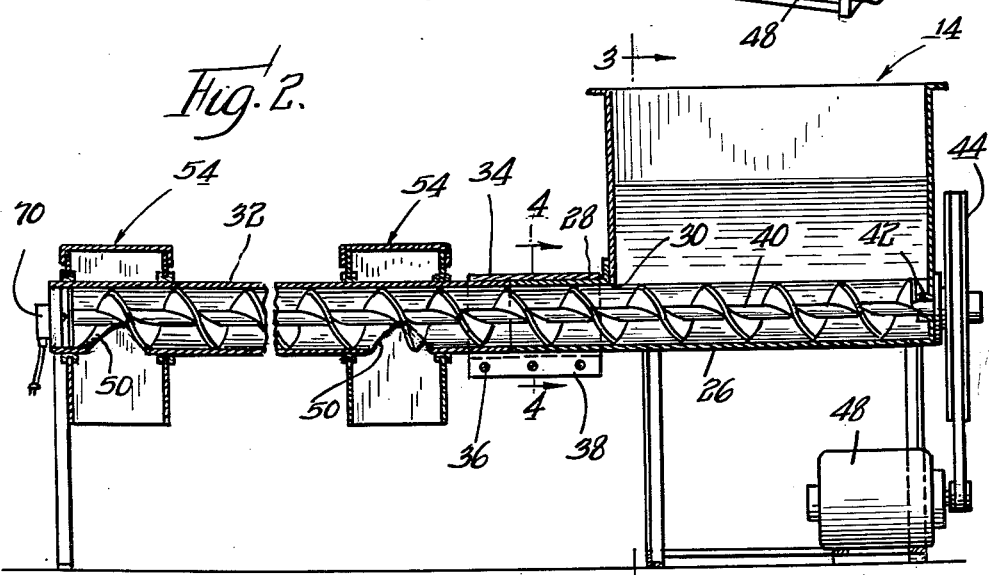
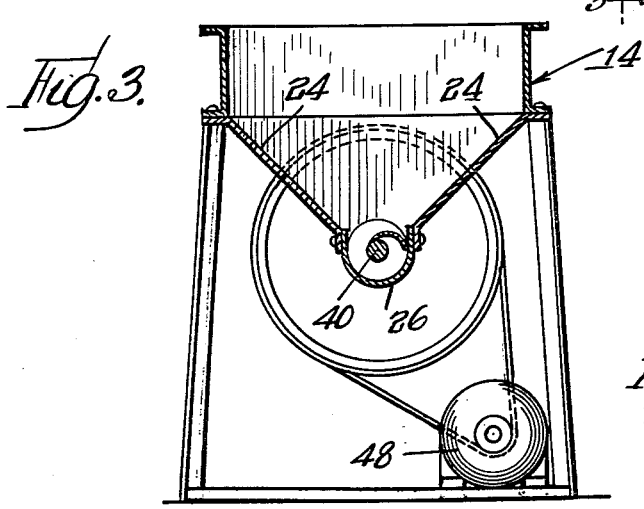
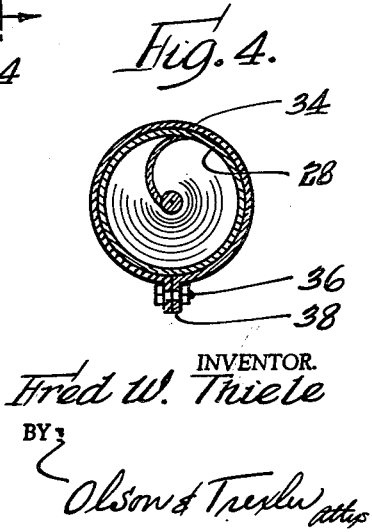
INVENTOR.
Fred W. Thiele
BY
Olson & Trexler attys Jan. 22, 1963 F. W. THIELE 3,074,534
LOOSE MATERIAL DISTRIBUTING APPARATUS
Filed Feb. 20, 1959 2 Sheets-Sheet 2
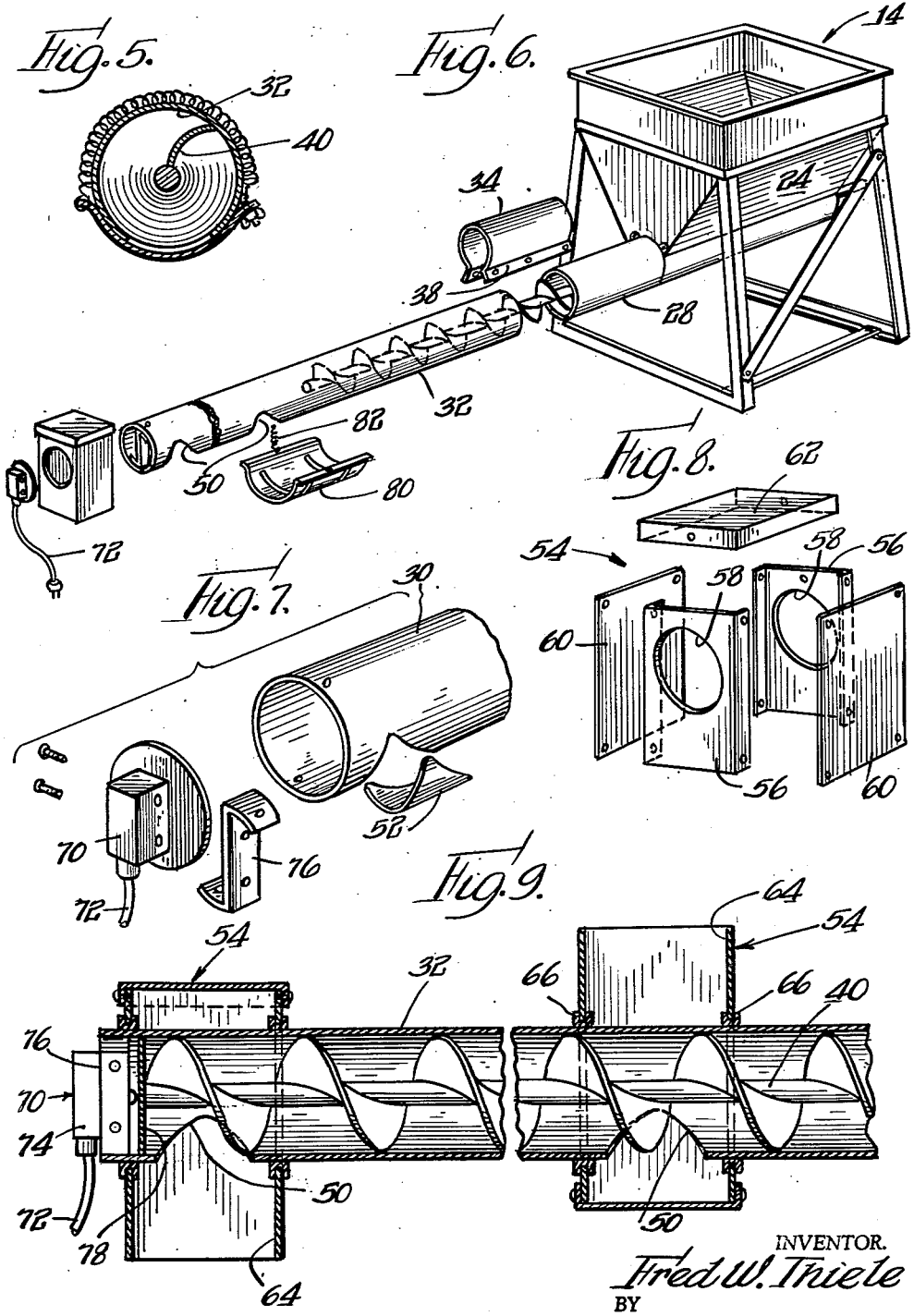
INVENTOR.
Fred W. Thiele
BY
Olson & Trexler
attys.

United States Patent Office 3,074,534
Patented Jan. 22, 1963

3,074,534
LOOSE MATERIAL DISTRIBUTING APPARATUS
Fred W. Thiele, Colon, Mich., assignor to Babson Bros.
Co., Chicago, Ill., a corporation of Illinois
Filed Feb. 20, 1959, Ser. No. 794,586
2 Claims. (Cl. 198—66)

The present invention relates to power driven apparatus for distributing loose material to a plurality of spaced discharge points.

While the apparatus is not necessarily limited to any particular application or use it is especially well suited for use in maintaining an adequate supply of feed in livestock feeding bins such as those used in dairy barns. An important consideration here is the characteristic lack of any uniformity in the number, location, and spacing of feeding bins in different livestock feeding installations. Consequently, any means used in this environment to distribute feed to the feeding bins must be specifically adapted to the number and location of bins employed by each user. This, of course, creates serious problems in manufacturing distributing apparatus for this purpose on a mass production basis.

Moreover, a user may very well find it necessary to change the number and relative location of the feeding bins in use in order to serve his needs to best advantage. This further complicates the problem of supplying feed to the bins by material distributing equipment susceptible of being produced on a mass production basis. Added to this is the overriding consideration of stringent limitations on the cost of any material distributing apparatus which may be used to an economic advantage in supplying feed to livestock feeding bins. This, in effect, can rule out the use of feed distributing apparatus which must be specially designed and specially built on a custom basis for each installation.

This limitation on the cost of the material distributing equipment which can be used to an economic advantage and the wide variations in the number and location of distributing points, while characteristic of problems inherent in the distribution of feed to livestock feeding bins, are by no means limited to this environment. They are present in many situations where it may be desirable to use power conveying apparatus to distribute loose material to a plurality of variably spaced distributing points.

One object of the invention is to provide improved loose material distributing apparatus economically manufactured on a mass production basis in a standardized design, which can be easily installed without any particular skill and readily adapted to distribute material to any number of distribution points having any desired spacing from each other and from the supply source of material to be distributed.

Another object is to provide improved material distributing apparatus of the character recited in the previous object which is particularly advantageous in feeding livestock, not only because of its extremely versatile ability to distribute feed to an indeterminate number of feed bins having any desired spacing from each other, but also because of a capacity which the improved apparatus has for maintaining an adequate supply of feed in a series of feeding bins without over-filling of any of the bins while at the same time limiting operation of the distributing apparatus to that which is essential for physically conveying the feed to the bins.

A further object is to provide improved loose material distributing apparatus of the above character in which distribution outlet units of a very simple construction provide for easy changes in the location of the distributing points, serve to direct the discharged material to either side of a distributing point, and provide a very simple means for cutting off the discharge of material at any selected distributing point.

Other objects and advantages will become apparent from the following description of the exemplary form of the invention illustrated in the drawings, in which:

FIG. 1 is a perspective view illustrating an installation of the improved apparatus for distributing feed to a series of livestock feeding bins;

FIG. 2 is a vertical longitudinal sectional view of the apparatus taken along the line 2—2 of FIG. 1;

FIG. 3 is a transverse sectional view taken along the line 3—3 of FIG. 2;

FIG. 4 is a fragmentary sectional view taken along the line 4—4 of FIG. 2;

FIG. 5 is a transverse sectional view taken along the line 5—5 of FIG. 1;

FIG. 6 is a partially exploded perspective view of the apparatus;

FIG. 7 is an exploded perspective of the extreme end portion of the apparatus;

FIG. 8 is an exploded perspective view of a typical drop chute unit incorporated into the apparatus; and FIG. 9 is a longitudinal sectional view of an end portion of the apparatus illustrating one drop chute turned into a cutoff position.

The loose material distributing apparatus constructed in accordance with the invention is well adapted to be manufactured and sold to the user as an unassembled kit or group of standardized components which the user can easily assemble without any particular skill and readily adapt to his particular needs. Moreover, the standardized components used in constructing the improved apparatus are of such character that it is quite easy for the user to select and purchase as a group only those components necessary for forming a distributing system adapted to his particular needs.

FIG. 1 illustrates an installation 10 of the improved apparatus as a system for distributing feed to a series of livestock feeding bins 12, shown in phantom.

The installation 10 comprises a feeder or receiving hopper 14 which forms a source of supply for the material to be distributed; in this instance, livestock feed. As shown, the receiving hopper 14 is supported on a simple steel frame 16. Generally rectangular as viewed from above, the receiving hopper 14 comprises an upwardly open, trough-shaped lower portion 18 surmounted by a vertical extension 20 providing additional storage capacity in the hopper. The extension 20 is formed by four vertical walls 22 extending upwardly from the upper periphery of the hopper portion 18.

Preferably, the receiving hopper 14 is constructed from steel plate stock as shown. Plates forming opposite longitudinal sides 24 of the trough portion 18 of the hopper converge downwardly, as shown in FIG. 3, to connect with opposite longitudinal sides of an upwardly open semi-cylindrical bottom 26 of the hopper.

A hollow cylindrical tube fitting 28 is connected to one longitudinal end of the hopper 14 adjacent the bottom of the hopper, as shown in FIGS. 2 and 6. The fitting 28 extends a short distance beyond the end of the hopper 14 in coaxial alignment with the center of the curvature of the semi-cylindrical bottom 26 of the hopper and communicates with the interior of the hopper through a circular opening 30, FIG. 2, in the adjacent hopper end wall.

The receiving hopper 14 thus formed is located by the user in a position which is most advantageous from the standpoint of ease of supplying feed to the hopper. Hence, it will usually be placed in a feed storage area. While the receiving hopper itself is capable of containing a rather large supply of feed, it may be installed so that it underlies and receives feed by gravity from a large feed storage bin (not shown).

Feed is conveyed from the receiving hopper 14 into overlying relation to each of the feeding bins 12 through a cylindrical auger tube 32. A cylindrical tube formed of 18 guage steel and four inches in diameter is quite suitable for this purpose.

The tube 32 is manufactured in standardized sections of different length. For example, tube sections may be supplied in lengths of 2, 3, 5 and 10 feet. It is a simple matter to determine the number and length of tube sections necessary to extend from the receiving hopper 14 to the most remote feeding bin 12.

The individual sections of cylindrical tube 32 are connected to each other and to the hopper outlet fitting 28 (which has a diameter equal to that of the tubing 32) by means of sheet metal couplers 34, FIGS. 1, 2 and 5. As is shown in FIG. 2, the outer end of the fitting 28 and the adjacent end of the tube 32 are disposed in abutting relation to each other. Each coupler 34 consists essentially of an arcuate sheet metal band (also denoted by the numeral 34) adapted to encircle the abutting tube junctures and having sufficient width to extend longitudinally along the tube 32 a substantial distance to either side of a tube juncture. Each couple 34 is tightened around the tube 32 by bolts 36 extending through opposing end flanges 38 of the coupler.

Feed is conveyed from the hopper 14 outwardly through the auger tube 32 by a helical auger 40 extending longitudinally along the semi-cylindrical hopper bottom 26 and out and through the tube as shown in FIG. 2. Like the auger tube 32, the auger 40 itself is manufactured in sections of different length adapted to be connected together to form an auger of the desired length.

The hopper end of the auger 40 is journaled in a bearing 42 in one end of the hopper 14, as shown in FIG. 2, and rotated by a pulley wheel 44 connected to the auger by a conventional speed reducer 46 mounted in the center of the pulley wheel. The pulley wheel 44 is belt driven by an electric motor 48. It has been found that electric motors of ½ horsepower are adequate for driving augers up to 30 feet in length and that a motor of ¾ horsepower will drive augers up to 60 feet in length.

Any number of outlets or discharge points may be provided at any desired location along the auger tube 32. This is done simply by cutting a discharge opening 50, FIGS. 2 and 9 in the underside of the auger tube 32 at each discharge point to be formed. Cutting of each discharge opening 50 is facilitated by use of a pattern 52, shown in FIG. 7. In the installation 10 shown in FIG. 1, a discharge opening 50 is cut for each feeding bin 12.

Each discharge opening 50 in the auger tube 32 is housed within a drop chute 54 of a very simple construction, FIGS. 2 and 8, which provides a convenient means for manually cutting off the outflow of material from the associated discharge opening 50 and which also provides a very effective means for automatically controlling the discharge of material from an associated opening in accordance with the instant supply of material or feed underlying the discharge chute.

Having a generally box-like form, each drop chute 54 comprises a pair of transverse plates 56 defining aligned openings 58 at one end thereof for receiving the auger tube 32. The two transverse plates 56 are connected in spaced relation to each other by two side plates 60 and an end plate 62. Except for the tube openings 58, each chute 54 thus formed defines only a single outlet opening 64 opposite from the end plate 62 and opening radially outward from the auger tube 32. A pair of annular seals 66 formed of rubber or other material of similar physical qualities are fitted into the respective chute openings 58 and encircle the auger tube 32 as shown in FIG. 9. The seals 66 frictionally engage the auger tube 32 to support the drop chute in any radial or longitudinal position on the tube to which it is moved manually.

To cut off the discharge of material from any outlet opening 34 it is necessary merely to rotate the associated drop chute 54 into such position that its discharge opening 64 extends upwardly from the auger tube 32 as indicated by the position of the right hand drop chute 54 in FIG. 9. The closed end of the drop chute which is then below the adjacent opening 50 quickly fills up with material cutting off the discharge of material at this point.

When in condition to discharge material, a drop chute 54 is turned so that its open end 64 depends below the auger tube 32 as indicated by the position of the left hand drop chute in FIG. 9. Moreover, a drop chute 54 can be tilted from a vertical position to discharge material to either side of the tube 32.

As the apparatus is installed to supply feed to feeding bins 12 as shown in FIG. 1, the vertical location of the drop chutes 54 relative to the feeding bins 12 is such that the drop chutes, when turned to discharge feed, extend down to the upper level to which the individual feeding bins are to be filled.

Thus when the installation 10 is put into operation, it first fills the feeder 12 nearest the hopper 14. This filling of the first feeder 12 continues until the level of feed in this feeder rises up to the depending open end 64 of the associated drop chute 54. This effectively cuts off the discharge of feed at this point thus preventing overfilling of the feeder.

The feed in the tube 32 then continues on past the first feeding bin 12 to the next bin 12. This operation is repeated for the successive feeders 12 until the feeder most remote from the hopper 14 is filled.

The auger drive is controlled automatically to operate only as necessary to convey the quantities of feed needed to maintain feed supplies in the feed bins 12.

For this purpose control switch means 70 is mounted in the outer end of the tube 32 to respond automatically to a build up of material within the tube beyond the last discharge opening 50. Thus when the last feed bin 12 is filled the material moves on to operate the switch means 70 which is connected through an electrical conductor 72 to shut off the auger driving motor 48.

As shown in FIGS. 7 and 9, the control switch means 70 comprises a microswitch 74 mounted on a Z-shaped bracket 76 in the extreme end of the tube 72 for operation by a transverse plate 78 movably disposed in the tube to react against and operate the switch 74 in response to a pressure exerted by loose material fed against the plate by the auger 40.

After the auger drive motor has been automatically shut off by the switch 74 after filling all the bins 12 it remains inactive until livestock feeding at the bins have lowered the level of the feed sufficiently for the material in the remote end of the auger tube 32 to spill out through the adjacent discharge opening 50, which is quite close to the end of the tube 32 as shown in FIG. 9, thus releasing the pressure of the feed on the movable plate 78 and allowing the switch 74 to restart the motor. This automatically fills each of the feeding bins 12 starting from the hopper 14 in the manner described. The net result is to automatically maintain an adequate supply of feed in all the feeders without overfilling any of the feeders.

Any one of the discharge openings 50 can be closed temporarily by rotating its drop chute 54 into cutoff position as described. If it is desired to close up any particular discharge opening 50 and provide another opening in a different position along the auger tube 32, this can be easily accomplished. A new opening 50 is cut into the tube 32 at the new location and the drop chute 54 moved longitudinally into embracing relation into the new opening from the discharge opening to be abandoned. The old opening is then readily sealed by an arcuate sheet metal seal 80 secured to the underside of the auger tube in closing relation to the old discharge opening 50 as illustrated in FIGS. 1 and 6. The seal 80 is held in place by a tension spring 82 extending over the top of the auger tube. The seal 80 can be easily removed to reactivate the sealed discharge opening.

In this manner the distributing apparatus can be readily modified to suit the changing needs of the user. If desired the distributing system can be lengthened by adding additional sections of auger tube 32 and auger 40. Moreover, distributor systems formed by this apparatus can be extended to any extent desired by using more than one distributing assembly in which case the outlet end of the auger tube 32 of the first assembly would be connected to discharge into the receiving hopper 14 of the next assembly. Such a compound installation is capable of extending around corners to carry the material to any place desired.

It will be evident that material distributing systems of this character can be readily adapted to numerous applications other than livestock feeding.

The invention is claimed as follows:

1. Material handling apparatus for distributing livestock feed to a plurality of spaced feeding bins, comprising: a feed receiving hopper; a cylindrical auger tube extending outwardly from said hopper above said bins and having discharge openings in the lower side thereof above each bin; a conveying auger extending from said hopper through said tube; rotary driving means connected to said auger to rotate the latter to displace material from said hopper out through said auger tube; drop chutes in longitudinally spaced, extending radially outwardly therefrom relation along said auger tube and movable in a radial plane about and in an axial plane longitudinally of said tube, one associated with each of said discharge openings, each of said drop chutes comprising a hollow casing having a pair of sealing elements in opposite sides thereof closely encircling said auger tube and frictionally engaging the latter to hold the drop chute in any rotary or longitudinal position on said tube and embracing a discharge opening in the tube, each drop chute defining an outlet therein opening radially outwardly in a single direction from said tube, the direction being dependent upon the rotary position of the drop chute on the tube.

2. Apparatus for distributing loose material to at least one discharge point which may be selectively positioned relative to the apparatus, comprising: feeder means adapted to contain loose material; a cylindrical material conveying tube connected with a lower portion of said feeder means and extending away therefrom; conveyor means for moving loose material from said feeder means through said tube toward the remote end thereof; a hollow drop chute encircling said tube and including two end walls, spaced from each other longitudinally along said chute for location on opposite sides of an outlet opening of substantial size cut from the lower side of said tube, said drop chute being supported on said tube by a pair of seals encircling said tube and sealably supporting said respective end walls and in encircling relation to the tube, said seals being slidable on the outer surface of the tube to provide for manual displacement of the drop chute rotatably and longitudinally relative to the tube to embrace a discharge opening in any longitudinal position along the tube, said drop chute defining a single discharge opening therein, opening radially outwardly from said tube and movable into and out of alignment with a discharge opening in the lower side of said tube effectively opening and closing the latter with rotation of the chute about the tube.

References Cited in the file of this patent

UNITED STATES PATENTS

| | | |
|---|---|---|
| 275,153 | Craik | Apr. 3, 1883 |
| 1,228,323 | Hudgins | May 29, 1917 |
| 1,401,155 | Jacoby | Dec. 27, 1921 |
| 1,649,752 | Stone | Nov. 15, 1927 |
| 2,321,838 | McBean | June 15, 1943 |
| 2,475,404 | Reed | July 5, 1949 |
| 2,646,023 | Virgil | July 21, 1953 |
| 2,737,402 | De Frumerie et al. | Mar. 6, 1956 |
| 2,785,792 | Cordis | Mar. 19, 1957 |